United States Patent [19]

Medal et al.

[11] Patent Number: 5,771,926
[45] Date of Patent: Jun. 30, 1998

[54] DOUBLE SEAT VALUE WITH SWITCH MONITORING DESIGN

[76] Inventors: George L. Medal, 2901 Buckingham Ct., Waukesha, Wis. 53188; Allan G. Worley, N52W35237 Lake Dr., Okauchee, Wis. 53069

[21] Appl. No.: 553,105

[22] Filed: Nov. 3, 1995

[51] Int. Cl.$^6$ .................................................. E03B 7/07
[52] U.S. Cl. ........................ 137/554; 137/552; 137/240; 137/614.18
[58] Field of Search ............................ 137/240, 614.11, 137/552, 554, 614.17, 614.18, 614.19

[56] References Cited

U.S. PATENT DOCUMENTS

| | | | |
|---|---|---|---|
| 1,734,419 | 11/1929 | Chitty | 137/552 |
| 3,538,948 | 11/1970 | Nelson et al. | 137/554 |
| 3,789,875 | 2/1974 | McGee | 137/553 |
| 4,368,753 | 1/1983 | Brakelmann et al. | 137/240 |
| 4,552,331 | 11/1985 | Smart, Jr. | 251/95 |
| 4,569,365 | 2/1986 | Namand et al. | 137/554 |
| 4,605,035 | 8/1986 | Rasmussen et al. | 137/240 |
| 4,687,015 | 8/1987 | Mieth | 137/240 |
| 4,856,551 | 8/1989 | Bräkelmann | 137/240 |
| 4,858,937 | 8/1989 | Fairlie-Clarke | 277/2 |
| 5,152,320 | 10/1992 | Zimmerly | 137/625 |
| 5,218,994 | 6/1993 | Jeschke | 137/554 |
| 5,226,449 | 7/1993 | Zimmerly | 137/597 |
| 5,232,023 | 8/1993 | Zimmerly | 137/637 |
| 5,275,201 | 1/1994 | Zimmerly | 137/454 |
| 5,329,956 | 7/1994 | Marriott et al. | 137/552 |

FOREIGN PATENT DOCUMENTS

| | | | |
|---|---|---|---|
| 132288 | 4/1977 | Germany . | |
| 2623301 | 12/1977 | Germany | 137/240 |

*Primary Examiner*—A. Michael Chambers
*Attorney, Agent, or Firm*—Leydig, Voit & Mayer, Ltd.

[57] ABSTRACT

A switch mounting arrangement enables close monitoring of seat position in a single-axis double-seat valve. The switch mounting arrangement includes a switch element disposed within a longitudinal bore of a mounting block. The bore also houses a transducer element that is adjustable within the bore to permit relative placement between the switch element and the transducer element so that very slight movement of the switch element and corresponding movement of the valve seat may be detected. This arrangement may then be incorporated into a monitoring circuit and/or control system.

10 Claims, 4 Drawing Sheets

DOUBLE SEAT VALUE WITH SWITCH MONITORING DESIGN

FIELD OF THE INVENTION

The present invention relates to the valve art, and more particularly, a mounting construction and circuitry that enables close monitoring of seat position in a valve arrangement.

BACKGROUND OF THE INVENTION

The present invention is generally directed to the control of fluid flow, particularly where it is important to segregate one product from another product, such as separating cleaning solution or the like from food product. For example, in the food processing industry, food product is typically supplied from a plurality of fluid sources in a processing system to a plurality of destinations, such as to filler machines for various sizes of containers. Conventional wisdom dictates that various dedicated lines be provided that connect the source tanks with the filler tanks. Often, these lines must be equipped to supply product in one conduit and, at the same time, flush a second conduit with cleaning solution.

Prior attempts to find a solution to this problem have included multiple valve systems that are utilized to direct food product to desired locations and provide cleaning solution. For example, U.S. Pat. No. 5,226,449 describes manifold valve assemblies that comprise multiple valve body arrangements. The multiple valve bodies include two or three valve chambers disposed about separate axes oriented in an angular relationship with respect to each other. The valve chambers are coupled together at their lower ends. Due to the separated nature of the valve chambers, this arrangement enables separation of opposed media.

Another known approach is disclosed in U.S. Pat. No. 5,275,201, wherein adjacent valve bodies are disposed in parallel with each other and are connected together with a cross conduit. While these arrangements provide adequate separation between food processing lines and cleaning lines, they are constructed with three separate valve bodies that project outwardly from each other and are somewhat bulky in design.

SUMMARY OF THE INVENTION

The present invention provides an improvement over prior art arrangements with a proximity detector mounting design and corresponding circuitry that closely monitors valve seat position. The invention may be utilized to detect the position of at least a first valve seat to ensure that the valve seat is retained in the closed position. The invention provides improved switch sensing accuracy that permits monitoring of the valve seat position to within approximately 0.005 inches in an arrangement that is easily installed.

The present invention may be embodied in a single-axis double-seat valve including an longitudinal valve axis, a first valve segment mounted to a valve stem aligned with the valve axis, and a second valve segment, spaced axially from the first valve segment, which is also mounted to a second valve stem spaced inwardly from the first valve stem. A switch monitoring assembly is disposed proximate to a portion of the first valve segment. The switch assembly comprises a limit switch element positioned transversely to the valve axis and a proximity switch element disposed at a fixed relative position proximate to the limit switch element. The limit switch element responds to axial movement of the valve with transverse movement toward the transducer element. Such limit switch movement is detected by the proximity switch element. In this way, a signal indicative of valve seat position is provided by the proximity switch element.

The switch monitoring assembly may be arranged in a monitoring circuit that measures loss of seal contact with either the first valve seat or the second valve seat. The monitoring circuit includes a first switch monitoring assembly for detecting movement of the first valve seat and a second switch monitoring assembly for detecting movement of the second valve seat. The monitoring circuit detects when the first switch assembly detects a closed valve position and when the second switch assembly detects a closed valve position and provides a signal denoting a safe condition.

BRIEF DESCRIPTION OF THE DRAWINGS

FIG. 5a and FIG. 5b illustrate the coupling of the pair of switches with respect to the double-seat valve according to the mounting arrangement of the present invention.

DETAILED DESCRIPTION OF THE PREFERRED EMBODIMENT

Generally, the present invention relates to a sensor construction and circuit design for a double-seat valve arrangement that permits very accurate sensing of valve seat position of first and second valves. The invention may be utilized in a totally contained flow system wherein opposed media are prevented from intermixing with each other at selected times. For example, the invention may be used for separating food product such as dairy product from cleaning solution in pipelines that are permanently installed.

Figure 1:
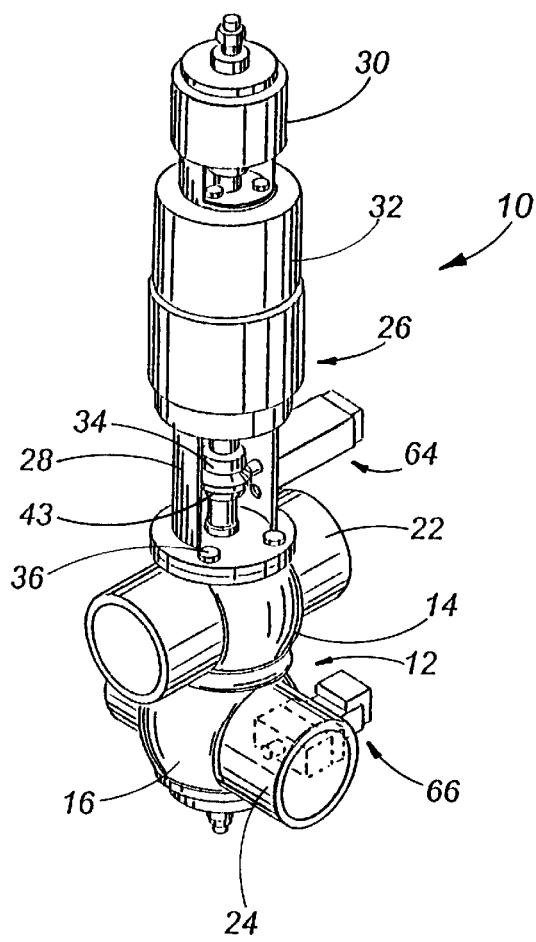
FIG. 1 is an isometric view of a double-seat valve including a switch monitoring design according to the present invention.

FIG. 1 is an isometric view of an axially disposed, double-seat valve 10 that utilizes the present invention. The double-seat valve 10 is similar to that disclosed in U.S. Pat. No. 4,368,753, the subject matter of which is incorporated herein by reference. The valve 10 comprises a valve housing 12 enclosing upper and lower ball-shaped valve bodies 14, 16 (see also FIGS. 2–3). The valve bodies 14, 16 each define axially aligned upper and lower valve chambers 18, 20, respectively, and are preferably fabricated as one-piece ball housings to eliminate the presence of "dead" spaces, while optimizing flow characteristics through the valve chambers. The valve bodies 14, 16 respectively provide fluid communication with first and second fluid paths denoted by conduit paths 22, 24. In some instances, the first and second fluid paths 22, 24 carry food product, while in other instances, one or both of the fluid paths carries cleaning solution such as when the path undergoes a "clean-in-place" (CIP) operation.

Figure 2:
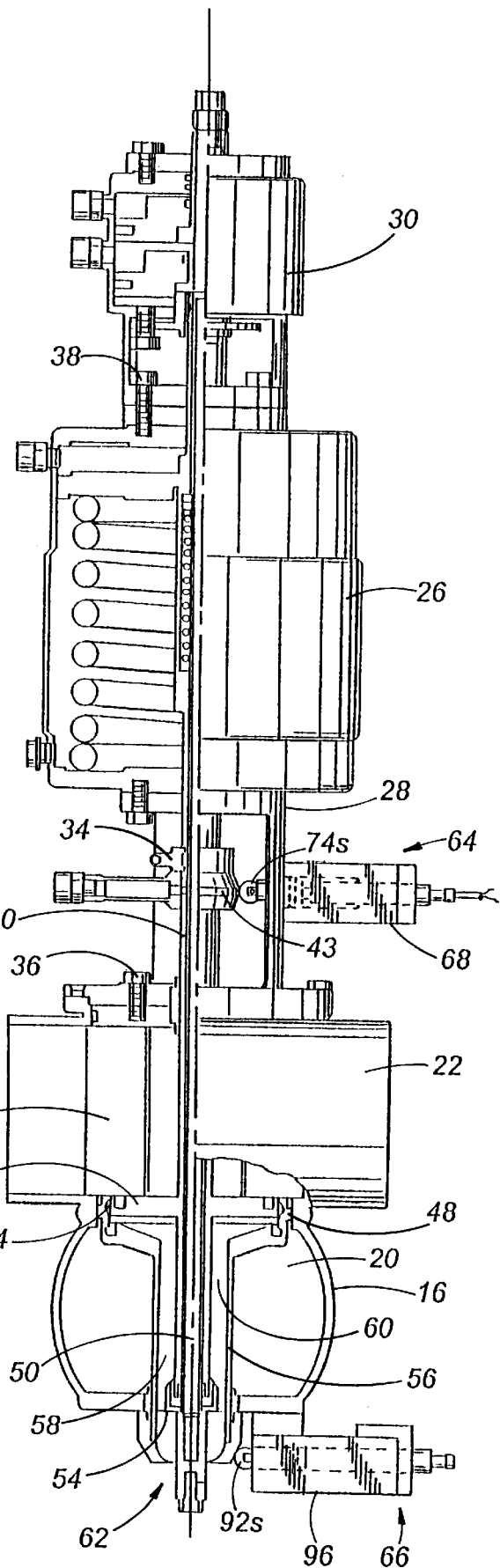
FIG. 2 is sectional view of the double-seat valve of FIG. 1 shown in a closed position.
Figure 3:
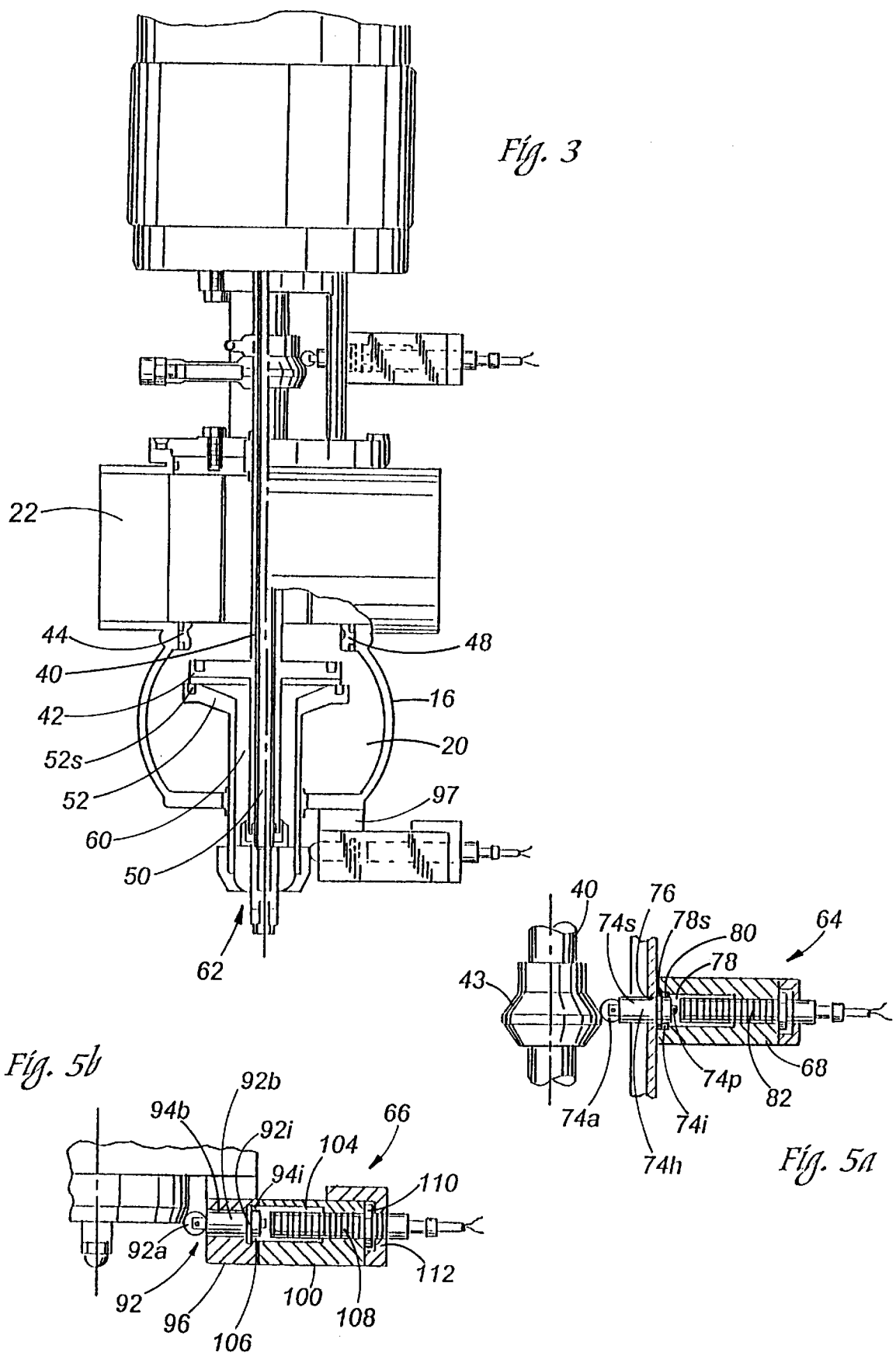
FIG. 3 is a sectional view of the double-seat valve of FIG. 1 shown in an open position.

FIG. 1, and also FIGS. 2–3, illustrate a valve actuator section 26 connected via a yoke section 28 to the valve housing 12. The actuator section 26 includes a valve seat lift actuator assembly 30 which functions to operate the respective valve seats during cleaning cycles as will be understood by those skilled in the art, a main actuator cylinder 32 that operates to open and close the valves, and a coupling arrangement 34. The yoke section 28 is fastened to the valve housing 12 with the use of screws such as screw 36 or other suitable fastening means. Similarly, the seat lift actuator assembly 30 is connected to the main actuator cylinder 32 by suitable fastening means such as the screw 38 shown in FIG. 2.

The details of the valve arrangement are also shown in FIGS. 2–3. As shown therein, the actuator cylinder 32 is operatively connected via the coupling 34 to an upper valve stem 40. The upper valve stem 40 extends through the center of the upper and lower valve bodies 14, 16 and is connected, proximate the upper valve body 14, to an upper valve disc member 42. A position cam 43 is disposed on the upper valve stem 40 in the yoke section 28 of the valve 10. As described below, this provides a reference surface for detecting axial movement of the upper valve disc member 42.

The upper valve disc member 42 is designed to sealingly engage with an upper valve seat 44 disposed proximate to the upper valve body 14 as shown in FIG. 2. In this regard, the valve arrangement includes upper and lower valve seats 44, 46 formed by inwardly protruding flanges disposed on a ring member 48 located between the upper and lower valve bodies 14, 16. The upper valve disc member 42 includes an elastomeric ring seal 42s that abuts in sealing engagement with the upper valve seat 44 when in the closed position of FIG. 2. This elastomeric seal 42s is preferably a profile seal that generally conforms to the ball housing surface. In order to move the upper valve to the open position, the disc member 42 is moved axially away from the valve seat 44 by movement of the upper valve stem 40 such as is shown in FIG. 3.

The actuator cylinder 32 is similarly operatively connected via a lower valve stem 50 to a lower valve disc member 52. In particular, the lower valve stem 50 is connected to a spacer 54, which in turn, is connected to a cylindrical support piece 56 that supports the lower valve disc member 52. As described below, this arrangement defines an annular leakage chamber 58 that separates the upper and lower valve seats and permits an opening to atmosphere. The upper and lower valve stems 40, 50 shown in FIGS. 1–3 are axially aligned with the lower stem 50 disposed inwardly of the upper stem 40. The lower valve disc member 52 similarly includes an elastomeric ring seal 52s that sealingly engages the lower valve seat 46 when in the closed position. The lower elastomeric ring seal 52s is likewise a profile seal that conforms to the lower valve body 16. In order to move the lower valve to the open position, the disc member 52 is urged axially away from the valve seat 46 by downward movement of the lower valve stem 50 and concomitant movement of the cylindrical support 56.

When in the closed position, the actuator 26 preferably applies a sufficient compressive force to maintain both the upper and lower valves closed against five (5) bar line pressure. In the preferred embodiment, the compression of the valve seal elastomer is approximately 0.032 inches for both the ring seals 42s and 52s corresponding to the respective upper and lower valves when in the closed position.

The area separating the disc members 42, 52 defines a leakage detect chamber 60 that terminates at a leakage outlet 62. As shown in FIG. 2, when the upper and lower valves are in the closed position, the leakage detect chamber 60 separates the upper and lower valve seats 44, 46 which provides an opening to atmosphere via outlet 62. In this position, two separate fluid streams may be directed through the respective valve bodies 10 without the possibility of intermixing.

In operation, the actuator assembly 26 typically provides axial movement of the upper valve stem 40 to displace the upper disc member 42 and its corresponding seal 42s from the upper valve seat 44. As the upper disc member 42 is urged downwardly, the lower side of disc member 44 contacts the elastomeric seal 52s corresponding with the lower disc member 52. This action seals off the leakage chamber 60 and separates the leakage chamber 60 from the product flow area. At the same time, the lower disc member 52 is pressed from the lower valve seat 46 in order to open fluid streams 22, 24 to each other as shown in FIG. 3.

Figure 4:
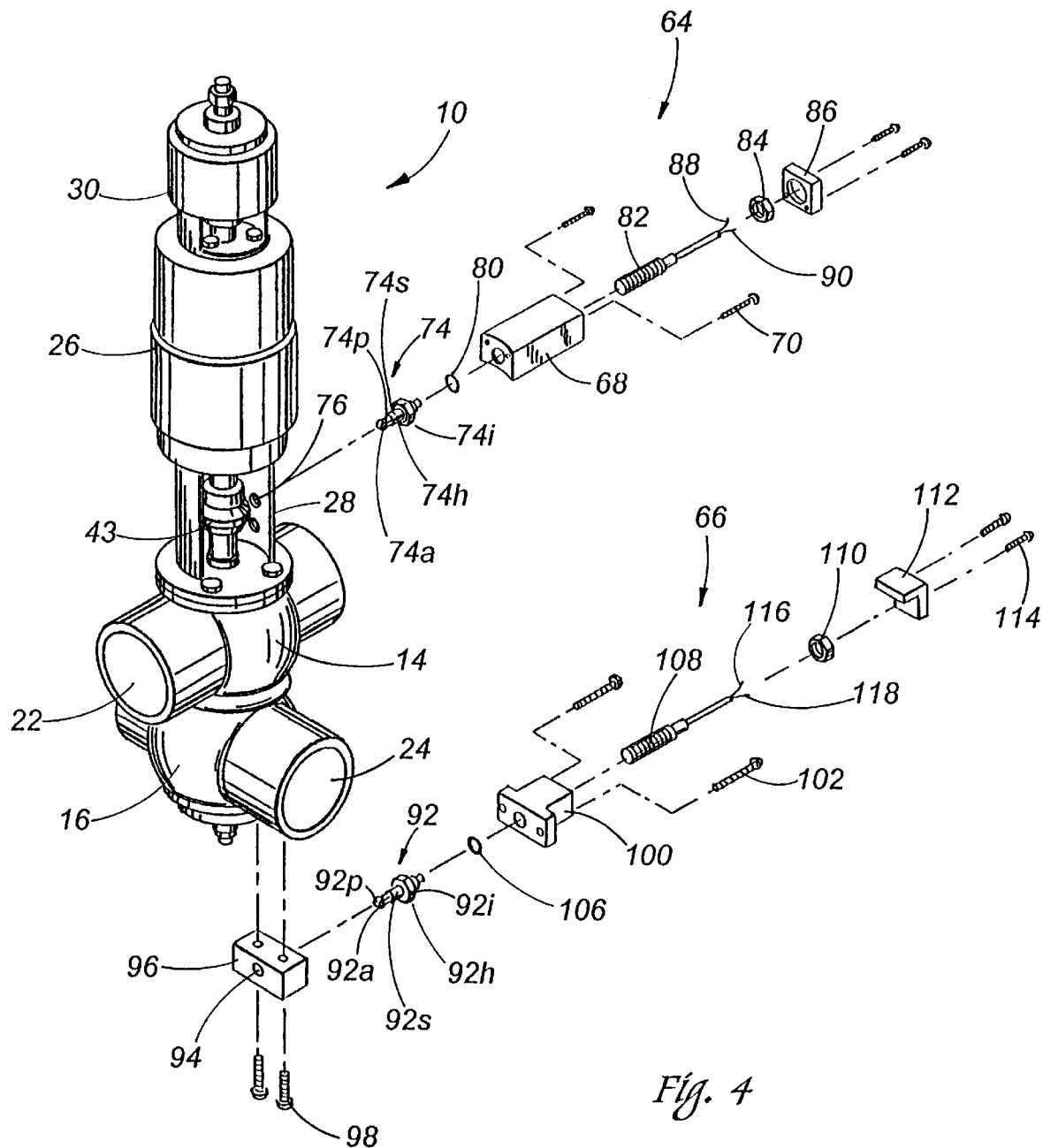
FIG. 4 is an exploded view of the double-seat valve illustrating the switch mounting arrangement of the present invention.

The main structural details of the switch construction and monitoring design according to the present invention are shown in FIG. 4, FIG. 5A and FIG. 5B. FIG. 4 is an exploded view of a first switch mounting subassembly 64, which detects axial movement corresponding to movement of the upper valve seat 44. As described in greater detail below, the first switch mounting subassembly 64 is located proximate to the position cam 43 for precisely detecting movement of the position cam 43 and corresponding movement of the upper valve disc member 42.

FIG. 4 also shows a second switch mounting subassembly 66, that detects movement corresponding to axial movement of the second valve seat 46. This switch mounting subassembly 66 is disposed proximate to the distal end of the lower valve stem 50 for precisely monitoring movement of the lower valve stem 50 and corresponding movement of the lower valve disc member 52.

The first switch subassembly 64 comprises a mounting block 68 that is located proximate to the upper valve stem position cam 43 with the use of screws such as screw 70 sized for receipt within suitable openings (not shown) formed in the yoke section 28. The mounting block 68 houses a limit switch style plunger subassembly 74. The plunger subassembly 74 includes a sensing or actuating roller end 74a coupled with a spring loaded plunger rod 74p. The plunger rod 74p is contained in a housing 74h including an increased diameter housing section 74i, and a cylindrical sleeve housing section 74s coupled with the increased diameter section 74i in surrounding relation with respect to the plunger rod 74p.

As best seen in FIG. 5a, the sleeve housing section 74s is sized to fit within an opening such as opening 76 formed in the yoke section 28. Similarly, the increased diameter section 74i is fitted within a slotted end 78s of a longitudinal bore 78 formed within the mounting block 68. When the mounting block 68 is secured to the yoke section 28 with mounting screws such as screw 70, one end of the increased diameter section 74i of the switch 74 abuts against the yoke section wall 28 while its opposed end is retained within the slotted end 78s of the longitudinal bore 78. A locking washer or clamping screw (not shown) not 80 may be utilized to aid in retaining the switch 74 in place within the longitudinal bore 78.

The opposed end of the bore 78 is threaded for receiving a proximity switch transducer element 82. In the preferred embodiment, the transducer element 82 is removed from a proximity switch of the type Quadranorm®, manufactured by Efector. The transducer element 82 is longitudinally threadably adjustable within the longitudinal bore 78 so that it may be placed a desired relative position with respect to the end of the limit switch plunger rod 74p opposite to the actuating roller end 74a.

The transducer element 82 is secured in place with fastening means such as a set screw 84. A cover 86 is placed in surrounding relation with respect to the set screw 84 in order to prevent inadvertent movement of the set screw 84 and corresponding relative movement between the transducer 82 and limit switch 74. A tamper resistant set screw (not shown) such as a spanner head or tri-groove head may also be used. A pair of electrical leads or terminals 88, 90 of the transducer 82 extend outwardly from the mounting block 68 for easy access and connection with monitoring circuitry. As described below, these leads are connected in a suitable control circuit that permits close monitoring of valve seat position.

When the subassembly is installed, the actuating or sensing end 74a of the limit switch 74 is placed in contacting relation with the upper valve position cam 43. Inasmuch as the position cam 43 is coupled via through the upper valve stem to the upper valve 42, any slight axial movement of the upper valve position cam 43 due to actuation of the upper valve 42 either toward or away from the upper valve seat 44 provides a transverse displacement of the sensing end 74a and the plunger rod 74p. Such transverse movement is sensed by the transducer element 82 and a sensing signal indicative of movement of the upper valve 42 with respect to the upper valve seat 44 is provided.

As discussed below, the circuit for the first switch is wired such that it is normally open/held closed when the valve seat is in the closed position. Inasmuch as the valve is typically utilized in a processing system, this signal may also be utilized by appropriate feedback circuitry for providing appropriate control signals to indicate a safe position prior to initiation of a process operation. This feedback program is referred to as a safety interlock.

The second switch subassembly 66 similarly comprises a second plunger subassembly 92. As best seen in FIG. 5b, the plunger subassembly 92 includes a sensing or actuating roller end 92a coupled with a spring loaded plunger rod 92p. The plunger rod 92p is contained in a housing 92h including an increased diameter housing section 92i, and a cylindrical sleeve housing section 92s coupled with the increased diameter section 92i and is likewise in surrounding relation with respect to the rocker rod 92a.

The switch housing 92h is positioned within a longitudinal bore 94 formed within a lower switch mounting bracket piece 96. The bore 94 is sized with a first increased diameter section 94i to receive the increased switch housing diameter portion 92i and a second reduced diameter section 94b sized to receive the sleeve portion 92s of the switch plunger subassembly 92. The bracket piece 96, in turn, is mounted to a bottom flange 97 of the valve 10 with the use of fastening means such as screw 98 as shown in FIG. 5b. A lower mounting block 100 mates with the bracket piece 96 with the use of screws such as screw 102.

The lower mounting block 100 likewise includes a longitudinal bore 104 that has a reduced diameter with respect to the bore section 94i formed in the bracket piece 96. An elastomeric backing spring (O-ring) 106 aids in retaining the switch in place. In this way, the limit switch 92 is located at a precise relative location with respect to the distal end of the lower valve stem 50.

The end of the bore 104 opposite the switch 92 is threaded and sized to receive a proximity switch transducer element 108. The transducer element 108 is adjustable within the lower switch mounting block 100 so that it may be placed at the desired relative position with respect to the limit switch plunger arm 92p. A set screw 110, or alternatively a tamper resistant set screw or a tri-groove head, may likewise be utilized to secure the transducer 108 in place. A cover piece 112 is placed in surrounding relation with respect to the set screw 52 to prevent inadvertent removal thereof with the use of fastening means such as screw 114 as shown in FIG. 4. A pair of electrical leads 116, 118 from the transducer 108 extend outwardly from the subassembly 66 for easy access. As described below, these terminals are connected in a suitable control circuit that permits close monitoring of the lower valve seat position.

As noted above, when the subassembly is installed the actuating or sensing end 92a of the limit switch plunger 92 is placed in contacting relation with the distal end of the lower valve stem 50. Accordingly, any slight axial movement of the lower valve stem 50 such as downward movement thereof due to actuation of the lower valve from valve seat 46 provides a transverse displacement of the sensing end 92s and the plunger rod 92p. Such movement is sensed by the transducer element 108 and a sensing signal indicative of movement of the second valve away from the lower valve seat 46 is provided. In the preferred embodiment, the transducer element is adjustably positioned relative to the switch which permits sensing accuracy to within 0.005 inches of movement. This arrangement likewise represents a significant improvement in sensing accuracy over prior designs, which provided sensing accuracy to within 0.187 inches. As discussed below, the circuit for the second switch is wired such that it is normally closed when the valve seat is in the closed position. This signal may also be utilized by appropriate feedback circuitry for providing appropriate control signals to indicate a safe position for the purpose of interlock process operation. The circuit for the second switch is wired such that it is normally closed when the valve seat is in the closed position.

This arrangement overcomes significant problems associated with prior designs. For example, the proximity sensor transducer elements 82, 108 do not have their respective targets moving past the sensor. This avoids the hysteresis between the "switched-on" condition and the "switched-off" condition normally present in electronic proximity switches that operate with the use of eddy currents. This results in inaccuracy of measurement. Accordingly, the present invention permits very accurate sensing of vertical axial movement of the valve shaft with a mechanical/electronic switch construction disposed in a horizontal axis.

Figure 6:
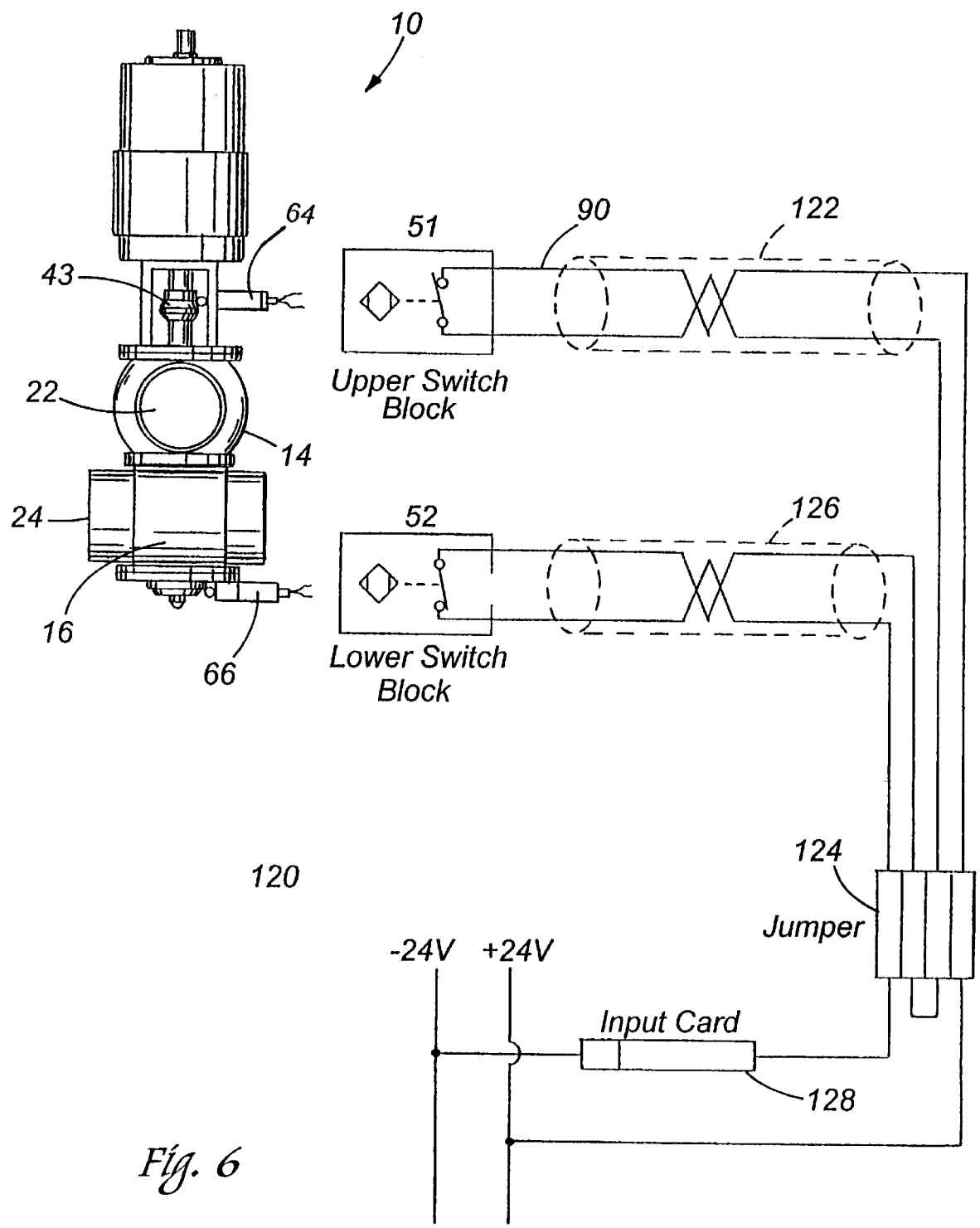
FIG. 6 is a schematic representation of a monitoring circuit for use with the double-seat valve of FIGS. 1–4.

The switch mounting subassemblies 64, 66 may be utilized in a monitoring circuit 120, as shown schematically in FIG. 6. The upper subassembly 64 is schematically shown in FIG. 6 as a switch S1. One of the leads 88 from the transducer 82 of the first switch subassembly 64 is coupled via appropriate electrical cabling 122 through a jumper terminal 124 disposed at a remote electrical control station to a positive voltage source. The second lead 90 of transducer 82 is likewise coupled via cabling 122 to the jumper terminal 124. This lead is electrically connected through cabling 126 to the first lead of the transducer block to one of the electrical leads 116 of the second transducer 108. The second lead 118 is coupled through the jumper terminal 124 to an input card 128 disposed at the control station. This input card is a component of a PLC controller as will be understood by those skilled in the art.

The circuit preferably operates such that the first switch is wired "normally open". That is, the transducer element 82 supplies a signal to complete the electrical monitoring circuit only when the first switch assembly 64 senses that the upper valve is in the closed (safe) position. On the other hand, the second switch (denoted in FIG. 5 as S2 is wired "normally closed". That is, the transducer element 108 supplies a signal to open the electrical monitoring circuit only when the second switch assembly 66 senses that the lower valve is not in the closed (safe) position. As shown, both switches must detect a safe or closed valve position to provide a signal indicative of a safe condition to the input card. Otherwise, the sensing circuit will indicate an unsafe valve position so that appropriate corrective action may be taken.

Accordingly, a switch block mounting design and control circuit for use in a double seated valve that meets the aforestated objectives has been described. The invention may be used to detect the position of multiple valve seats prior loss of elastomer seat compression with a low cost solution that is easily installed. It will be apparent to those skilled in the art that a number of modifications can be made to the invention disclosed, particularly by those having the benefit of the foregoing teachings, without departing from the spirit of these principles. Accordingly, it is intended that the invention be limited only by the scope of the appended claims.

What is claimed is:

1. A sensor construction for sensing movement of a valve with respect to a valve seat, the valve including a actuator stem providing movement of the valve along a valve axis, the sensor construction comprising:

a sensor housing disposed proximate to the actuator stem defining a bore transverse to the valve actuator stem;

a limit switch plunger rod having a first portion disposed within the bore of the housing and having a second portion in contacting relation with a portion of the valve actuator stem, the plunger rod being displaced when the actuator stem is moved; and a proximity sensor transducer spaced from the limit switch plunger rod portion within the bore of the housing, the proximity sensor transducer detecting transverse movement of the plunger rod, converting the sensed transverse movement to an electrical sensing signal, and providing the electrical sensing signal at a pair of output terminals when movement of the plunger rod is detected.

2. The sensor construction of claim 1 wherein the electrical sensing signal provides an information content corresponding to movement detected to within about 0.005 inches of displacement of the valve stem.

3. The sensor construction of claim 1 wherein the electrical sensing signal is an analog voltage having a magnitude proportional to the sensed transverse displacement.

4. A circuit for monitoring the position of a single-axis double-seated valve, the valve including a first valve segment and a second valve segment, each of the valve seats disposed in a single axis, the monitoring circuit comprising:

a first sensor for sensing movement of the first valve segment and providing a first signal when movement is sensed;

a second sensor for sensing movement of the second valve segment and providing a second signal when movement is sensed; and a logic circuit coupled with the first and second sensors providing an output signal indicating a safe condition in response to the receipt of a predetermined sequence of the first and second signals.

5. The invention as in claim 4 wherein the monitoring circuit provides a signal indicating an unsafe position of the valve when the first sensor senses an open position or when the second sensor senses an open position.

6. The invention as in claim 4 wherein the valve includes a first actuator stem for axially moving the first seat, the first sensor disposed proximate the actuator stem.

7. The invention as in claim 6 wherein the valve includes a second actuator stem for axially moving the second seat, the second sensor disposed proximate the second actuator stem.

8. The invention as in claim 4 wherein the first sensor comprises:

a sensor housing disposed proximate to the first valve segment defining a bore transverse to the first valve segment;

a limit switch plunger rod having a first portion disposed within the bore of the housing and having a second portion in contacting relation with a portion of the first valve segment, the plunger rod being displaced when the first valve segment is moved; and a proximity sensor transducer spaced from the limit switch plunger rod portion within the bore of the housing, the proximity sensor transducer detecting transverse movement of the plunger rod and providing the first signal when movement of the plunger rod is detected.

9. The invention as in claim 4 wherein the second sensor comprises:

a sensor housing disposed proximate to the second valve segment defining a bore transverse to the second valve segment;

a limit switch plunger rod having a first portion disposed within the bore of the housing and having a second portion in contacting relation with a portion of the second valve segment, the plunger rod being displaced when the second valve segment is moved; and a proximity sensor transducer spaced from the limit switch plunger rod portion within the bore of the housing, the proximity sensor transducer detecting transverse movement of the plunger rod and providing the second signal when movement of the plunger rod is detected.

10. A single-axis double-seat valve comprising:

a first valve coupled with a first actuator stem;

a second valve coupled with a second valve stem, the second valve stem being in axial alignment with the first valve stem;

a first sensor for detecting movement of the first actuator stem, the first sensor including a limit switch plunger rod disposed proximate the first actuator stem, and a proximity sensor transducer spaced from the limit switch plunger rod providing a first signal when movement of the plunger rod is detected;

a second sensor for detecting movement of the second actuator stem, the second sensor including a limit switch plunger rod disposed proximate the second actuator stem, and a proximity sensor transducer spaced from the limit switch plunger rod providing a second signal when movement of the plunger rod is detected; and and a control circuit coupled with the first and second sensors providing a signal indicating a safe position of the valve in response to the first and second signals.

* * * * *